United States Patent
Clifford

(10) Patent No.: US 8,438,630 B1
(45) Date of Patent: May 7, 2013

(54) DATA LOSS PREVENTION SYSTEM EMPLOYING ENCRYPTION DETECTION

(75) Inventor: Thomas G. Clifford, Edina, MN (US)

(73) Assignee: Symantec Corporation, Mountain View, CA (US)

( * ) Notice: Subject to any disclaimer, the term of this patent is extended or adjusted under 35 U.S.C. 154(b) by 626 days.

(21) Appl. No.: 12/413,821

(22) Filed: Mar. 30, 2009

(51) Int. Cl.
*G06F 17/00* (2006.01)

(52) U.S. Cl.
USPC ......... 726/13; 726/23; 713/150; 713/153; 713/168; 709/217; 375/240.02; 375/240.24; 704/500

(58) Field of Classification Search .......... 726/13, 726/23; 713/150, 153, 168; 375/240.02, 375/240.24; 704/500; 709/217
See application file for complete search history.

(56) References Cited

U.S. PATENT DOCUMENTS

| | | | |
|---|---|---|---|
| 5,440,311 A * | 8/1995 | Gallagher et al. | 342/132 |
| 5,495,580 A * | 2/1996 | Osman | 726/13 |
| 5,671,608 A * | 9/1997 | Wiggs et al. | 62/260 |
| 5,813,008 A | 9/1998 | Benson et al. | |
| 5,825,313 A * | 10/1998 | Kondo et al. | 341/67 |
| 5,990,810 A | 11/1999 | Williams | |
| 6,983,365 B1 | 1/2006 | Douceur | |
| 7,073,060 B2 * | 7/2006 | Asano et al. | 713/168 |
| 7,185,238 B2 | 2/2007 | Wedel et al. | |
| 7,249,264 B2 | 7/2007 | Belknap et al. | |
| 7,266,689 B2 | 9/2007 | Douceur | |
| 7,320,008 B1 | 1/2008 | Colgrove | |
| 7,356,701 B2 | 4/2008 | Margolus | |
| 7,454,070 B2 * | 11/2008 | Ito et al. | 382/232 |
| 7,590,866 B2 | 9/2009 | Hurtado et al. | |
| 7,730,299 B2 * | 6/2010 | Boebert et al. | 713/153 |
| 7,783,604 B1 | 8/2010 | Yueh | |
| 7,797,279 B1 | 9/2010 | Starling et al. | |
| 7,822,939 B1 | 10/2010 | Veprinsky et al. | |
| 7,827,602 B2 * | 11/2010 | Aaron | 726/13 |
| 7,849,065 B2 | 12/2010 | Kamani | |
| 7,895,652 B2 * | 2/2011 | Kolton et al. | 726/23 |
| 7,908,436 B1 | 3/2011 | Srinivasan et al. | |
| 7,913,309 B2 | 3/2011 | Starostin | |
| 8,041,074 B2 | 10/2011 | Rhoads | |
| 8,055,618 B2 | 11/2011 | Anglin | |
| 8,082,441 B2 * | 12/2011 | Gauvreau et al. | 713/153 |

(Continued)

OTHER PUBLICATIONS

Johnson, M., Ishwar, P., Prabhakaran, V., Schonberg, D. and Ramchandran, K., "On Compressing Encrypted Data," IEEE Transactions on Signal Processing, vol. 52, No. 10, Oct. 2004, pp. 2992-3006.

(Continued)

*Primary Examiner* — Thu Ha Nguyen
(74) *Attorney, Agent, or Firm* — Meyertons, Hood, Kivlin, Kowert & Goetzel, P.C.

(57) ABSTRACT

A system and method is disclosed for implementing a data loss prevention (DLP) system capable of detecting transmission attempts involving encrypted data. In response to detecting that the data is encrypted, such a DLP system may perform any number of configurable DLP actions, such as blocking the data transmission attempt and/or sequestering the data. The DLP system may determine that the data is encrypted, based at least in part, on a value of a compressibility measure of the data, such as a compression ratio. The DLP system may leverage other operating system and/or file system capabilities, such as file extensions, magic numbers, or other utilities. The DLP system may determine if the data is compressed rather than encrypted by attempting to decompress the file.

19 Claims, 6 Drawing Sheets

U.S. PATENT DOCUMENTS

| | | | |
|---|---|---|---|
| 8,121,198 B2 | 2/2012 | Thambiratnam | |
| 8,141,129 B2 | 3/2012 | Ray | |
| 8,156,092 B2 | 4/2012 | Hewett | |
| 8,234,703 B2* | 7/2012 | Aaron | 726/13 |
| 2002/0057213 A1* | 5/2002 | Heath | 341/51 |
| 2002/0102027 A1* | 8/2002 | Miyake et al. | 382/239 |
| 2005/0240414 A1* | 10/2005 | Tominaga | 704/500 |
| 2006/0050975 A1* | 3/2006 | Ito et al. | 382/232 |
| 2007/0014360 A1 | 1/2007 | Botzko | |
| 2008/0172430 A1 | 7/2008 | Thorstensen | |
| 2008/0178299 A1 | 7/2008 | Merkle et al. | |
| 2008/0243879 A1 | 10/2008 | Gokhale et al. | |
| 2009/0041237 A1 | 2/2009 | Takashima et al. | |
| 2009/0052540 A1* | 2/2009 | Gutman et al. | 375/240.24 |
| 2009/0063528 A1 | 3/2009 | Yueh | |
| 2009/0144819 A1* | 6/2009 | Babbar et al. | 726/13 |
| 2009/0268903 A1 | 10/2009 | Bojinov et al. | |
| 2009/0271402 A1 | 10/2009 | Srinivasan et al. | |
| 2009/0319772 A1 | 12/2009 | Singh et al. | |
| 2009/0327625 A1 | 12/2009 | Jaquette et al. | |
| 2009/0328134 A1 | 12/2009 | Ray et al. | |
| 2010/0198797 A1 | 8/2010 | Wideman | |
| 2011/0023109 A1* | 1/2011 | Aaron | 726/13 |
| 2011/0126084 A1* | 5/2011 | Serret-Avila | 714/807 |
| 2011/0208833 A1* | 8/2011 | Fallon | 709/217 |
| 2011/0219424 A1* | 9/2011 | Panasyuk et al. | 726/1 |
| 2011/0296164 A1* | 12/2011 | Boebert et al. | 713/150 |
| 2011/0310955 A1* | 12/2011 | Zhang | 375/240.02 |

OTHER PUBLICATIONS

"The Challenges of Deploying Information Rights Management Across the Enterprise," EMC Corp., 2008.

"Secure Data Deduplication," Storer et al., Oct. 31, 2008.

"Technical Overview of Microsoft Windows Rights Management (RM) in the Enterprise," Microsoft Corp., Feb. 2003.

"Data Loss Prevention," Prathaben Kanagasingham, Aug. 15, 2008.

* cited by examiner

DATA LOSS PREVENTION SYSTEM EMPLOYING ENCRYPTION DETECTION

BACKGROUND OF THE INVENTION

1. Field of the Invention

This invention relates to data loss prevention systems and, more particularly, to the detection and handling of encrypted data by data loss prevention systems.

2. Description of the Related Art

Organizations often maintain and handle sensitive data using computer systems and networks. Such data may be considered sensitive from a business and/or legal standpoint. For example, some computer files may contain proprietary information that the organization does not wish to be leaked to outside parties. In other examples, various legal constraints may require that an organization track personal information on its network. An organization may be legally required to abide by various data privacy and/or breach notification laws that require the organization to notify customers or other stakeholders when their information may have been exposed.

In order to identify, monitor, and protect sensitive data, organizations may employ a Data Loss Prevention (DLP) system. Such systems may also be known as Data Leak Prevention, Information Leak Detection and Prevention, Information Leak Prevention, Content Monitoring and Filtering, Extrusion Prevention System, among other names. In order to determine if a given file or other data stream contains sensitive information, a DLP system may scan the contents of the file or stream. If the contents are deemed sensitive, often according to a set of configurable heuristics, then the DLP system may take some protective action. For example, if a DLP system detects that a given user is attempting to transmit sensitive data to a third party, such as by emailing a sensitive file to a user on an outside network, the DLP system may detect and block the transmission attempt. The particular corrective action taken by the DLP system may depend on the type of sensitive information, administrator-configurable security settings, and/or a number of other factors.

A DLP system may scan the contents of any file before the file leaves the system, such as by email. In such an example, if a user attempts to transmit a document to an outside party by attaching the document to an email, the DLP system may scan the contents of that document before allowing or disallowing the attachment to be sent. If the DLP system determines that the document contains sensitive data (e.g., the document contains a header that includes the term "Confidential"), then the DLP system may prevent the email from being sent. Various other actions may be taken. For example, the DLP system may create a record of the transmission attempt, which may indicate the particular user, file, time of attempt, and the potential email recipient. In some instances, the DLP system may even sequester the file, for example, by encrypting it and moving it to an alternate location.

SUMMARY

In various embodiments, a DLP system may be configured to detect an attempt to transmit data. In response to detecting an attempt to transmit the data, the system may further determine whether the data is encrypted, and allow or disallow the attempt to transmit the data based, at least in part, on a result of determining whether the data is encrypted. In some embodiments, a DLP system may be configured to block transmission attempts involving encrypted data and/or sequester the encrypted data.

In some embodiments, a DLP system may determine if data is encrypted based on a value of a compressibility measure of the data. For example, the DLP system may determine whether the data is encrypted based on a compression ratio of the data. The DLP system may further be configured to allow or disallow the attempt to transmit the data based on whether the compression ratio of the data is within a particular range of compression ratios. In various embodiments, the particular range may be programmable by an administrator.

Figure 1:
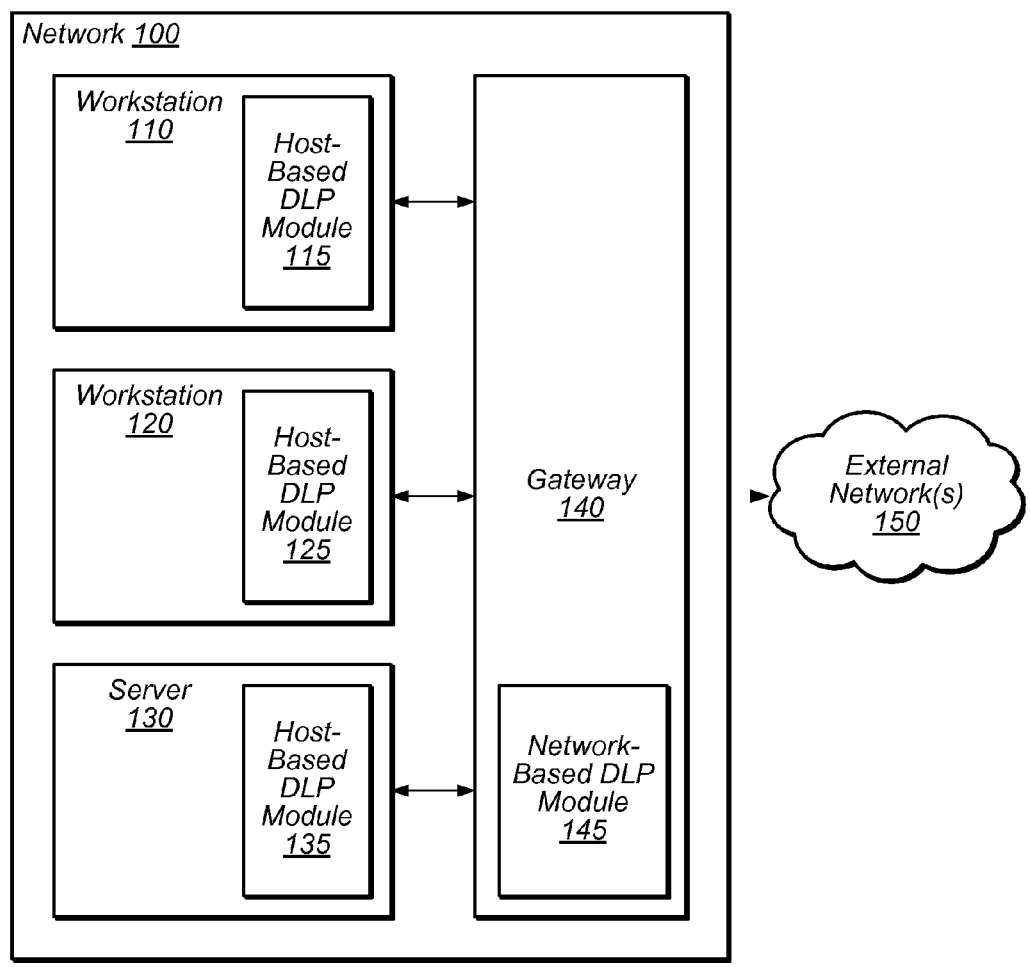
FIG. 1 is a block diagram of a data loss prevention system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

A Data Loss Prevention (DLP) system as disclosed herein may allow an organization to identify, monitor, and protect sensitive data on its computer systems and network. For example, a DLP system may scan the contents of a given file in response to detecting an attempt to transmit that file to an external or internal recipient. If the DLP system determines that the data is sensitive (e.g., contains personal, proprietary, or other private information), the DLP system may prevent the transfer and/or take other protective action (e.g., sequestering the file).

As used herein, the term data may refer to any collection of information stored by one or more computer readable storage media. For example, data may refer to a file on a file system and/or a file on a distributed file system. The term data may also refer to any part of a file. For example, a DLP system may identify only part of a file as containing sensitive or non-sensitive information. The term data, may also refer to a data stream, such as network traffic (e.g., packets). In some cases, a DLP system may monitor network traffic flows. For example, an email or an instant message may contain sensitive data that is detected by a DLP system. Data may also include any other transmission across or out of a network.

FIG. 1 illustrates one embodiment of a network 100 including a workstation 110, a workstation 120, a server 130, and a gateway device 140. As shown, each workstation 110 and 120 as well as server 130 includes a respective host-based DLP software module. A host-based DLP software module may execute on an end-user workstation or server and monitor network traffic incoming to or outgoing from the respective host. For example, in FIG. 1, DLP software module 115 executes on workstation 110 and monitors its network traffic. DLP software modules 125 and 135 execute on workstation 120 and server 130, respectively, and perform a similar monitoring function. In this context, server 130 and workstations 110 and 120 may be referred to as endpoint systems.

In FIG. 1, workstations 110 and 120, as well as server 130, reside within a common network 100. Using this network, the endpoints may communicate data to each other and to entities in external networks 150. For example, network 100 may be a local Ethernet network while external networks 150 may include a wide area network (e.g., internet) and other networks reachable via the wide area network. Data transmitted by the endpoint systems may be sensitive and its flow may therefore be monitored and controlled by the respective DLP system running on each endpoint system. Communications among the endpoint systems (110, 120, and 130) and from each endpoint system to entities on external networks 150 may include network file transfers, emails, instant messages, updates to databases, and/or any other data transfer.

Each host-based DLP software module 115, 125 and 135 may also monitor information transmitted via means other than a network. For example, if a user attempts to move sensitive information onto a removable drive, such as a flash drive, the DLP software may detect and disallow the transmission. In response to detecting that a given transmission is attempting to move sensitive data, the DLP software may disallow the transmission and/or sequester the data (e.g., by encrypting it and storing it in a safe location).

In addition to the host-based DLP software modules 115, 125 and 135, FIG. 1 also illustrates a network-based DLP software module 145 that functions to form a network DLP. A network DLP, sometimes referred to as a gateway-based DLP system, may include dedicated hardware and/or software, such as gateway 140, typically installed on the network for monitoring the flow of sensitive data across the network. For example, a network DLP may be installed on a gateway machine to monitor all ingress and egress traffic from a given network, such as network 100, to external networks, such as external networks 150. Thus, a network DLP may detect sensitive data leaks to outside sources. A network DLP may monitor network traffic across internal links of a network, such as internal emails and/or file transfers among the endpoint systems. A network DLP may inspect a data stream of network packets in order to determine which ones contain sensitive information. In such examples, a network DLP may need to identify sensitive information while observing multiple packet flows from various origins and to various destinations.

As will be described in further detail below, each of the DLP software modules 115, 125, 135 and 145 may be configured to, when executed, identify data as being sensitive based, at least in part, on specific content or keywords contained within the data (e.g., the word "confidential" appearing in a transmitted document), and to selectively control transmission of such data. In addition to providing such functionality, each of the DLP software modules 115, 125, 135 and 145 may be configured to detect and control transmission of encrypted data. It is noted that it may be desirable to detect and control transmission of encrypted data since the underlying content of such encrypted data may be obscured. More particularly, using a data encryption algorithm, such as RSA, AES, 3DES, etc., data may be encrypted into cipher text, in which the underlying meaning of the data may be obscured. Thus, for example, if a document containing the word "confidential" were to be encrypted, then the resulting cipher text may no longer contain the word "confidential" in a format that may be recognized if the DLP system were to simply detect certain keywords. In one scenario, a malicious user could attempt to circumvent the DLP system by encrypting data before transmitting the encrypted information (i.e., cipher text). A recipient may then receive the encrypted data and decrypt it using a decryption key, thereby circumventing the intended protection of the DLP system. In another scenario, a naïve user may accidentally transmit encrypted sensitive data to an outside party. Since the user may not be able to determine the contents of the data without decrypting it, he or she may not recognize that the data is sensitive. An outside party may then decrypt the cipher text to gain access to the sensitive information, such as by using a decryption key and/or by breaking the encryption.

Thus, in various embodiments, each of the DLP software modules 115, 125, 135 and 145 may prevent data loss, at least in part, by identifying encrypted data included in an attempted transmission. In some embodiments, encrypted data may be identified in response to an attempt to transmit it from an endpoint system to another entity (e.g., to an external entity outside the network, to an internal entity such as another endpoint, etc.). Since encrypted data may contain sensitive information, each of the DLP software modules 115, 125, 135 and 145 may further be configured to perform one or more data loss prevention actions in response to having detected the encrypted data and/or a transmission attempt of the encrypted data. In various embodiments, a system administrator may further configure these actions. For example, in one embodiment, each DLP software module may be configured to detect an attempt to transmit encrypted data, disallow that transmission, and/or sequester the data.

It is noted that although FIG. 1 illustrates a system in which both host-based DLP functionality (i.e., as implemented by DLP software modules 115, 125 and 135 on respective host machines) as well as network-based DLP functionality (i.e., as implemented by DLP software module 145 on gateway 140) are employed, other systems are also possible. For example, in various embodiments, the DLP functionality as described herein may be provided solely within one or more host machines, or solely on a gateway device.

Figure 2:
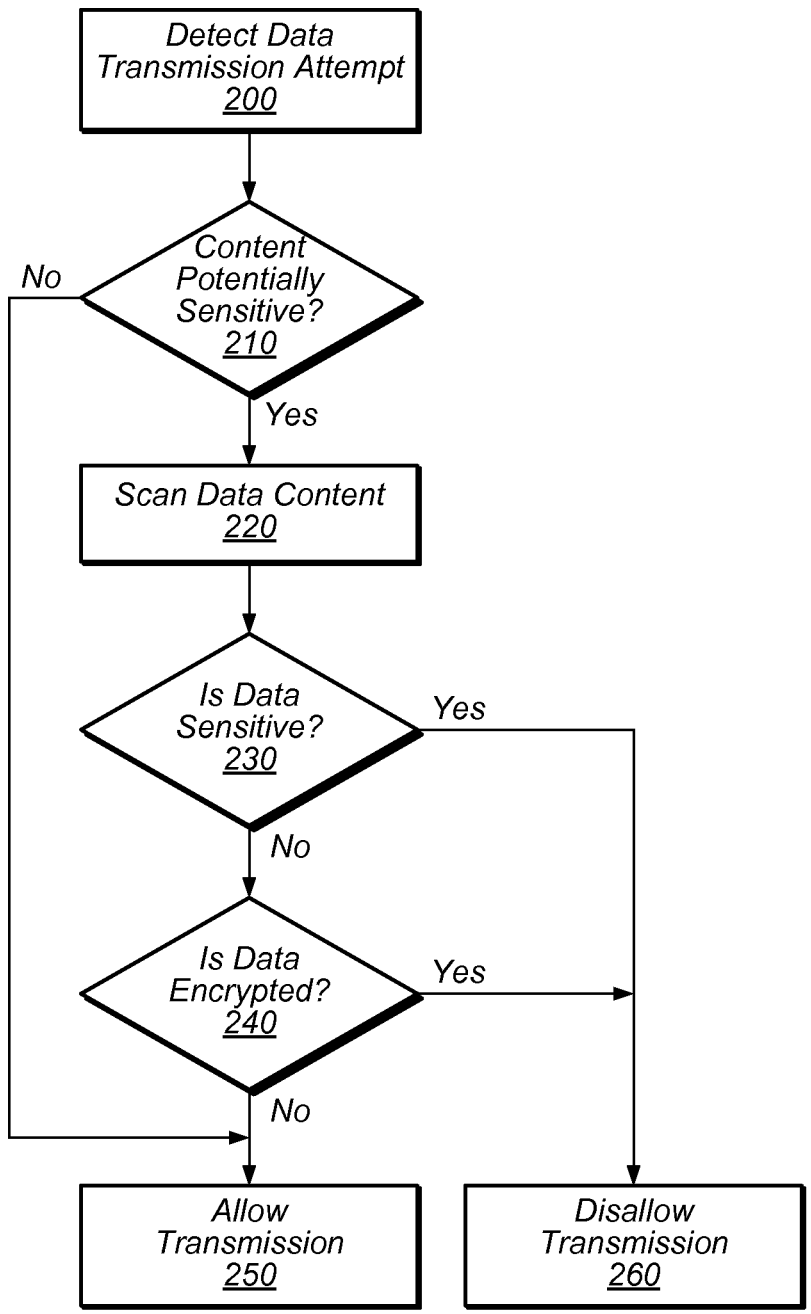
FIG. 2 is a flowchart diagram illustrating a method for processing cipher text with a data loss prevention system, according to one embodiment.

FIG. 2 is a flowchart illustrating a method for preventing loss of encrypted data, according to some embodiments. It is noted that in various embodiments, any of DLP software modules 115, 125, 135 and/or 145 may be configured to, when executed, cause the depicted DLP functionality to be performed. In the following description, references to the "DLP system" are intended to refer to the DLP functionality as provided by any one of DLP software modules 115, 125, 135 and/or 145.

As illustrated, the method of FIG. 2 may begin when the DLP system detects a data transmission attempt, as in 200. For example, the transmission attempt may comprise a user sending an email and/or sending an email attachment. Other examples of data transmission attempts may include a file transfer (e.g., FTP, SCP, etc), a computer-to-computer network file copy, a file upload to a webpage (e.g., file transfer over HTTP) or any other transfer of information. As discussed above, a transmission attempt need not be limited to transfers of files. The content of emails, instant messages, or of general network traffic may be monitored to prevent data loss in a system and/or network.

A data transmission attempt may include a user on the network attempting to transmit data to a party external to the network. In other examples, a data transmission may be internal to an organization. For example, a user may be attempting to transfer data from one endpoint system to another.

In some instances, a data transmission need not be directly initiated by a user. For example, an archival or backup process that transfers any number of files from one system to another may make data transmission attempts. In some instances, a user action may indirectly cause sensitive data to be transmitted. For example, if a website requests sensitive information from a web browser protected by a DLP system, the DLP system may prevent the transfer of such information.

In response to detecting a data transmission attempt, as in 200, the DLP system may determine if the data is potentially sensitive, as in 210. In some embodiments, the DLP system may make such a determination for any or all of the data that the attempted transmission would move. If the data is deemed potentially sensitive, as indicated by the affirmative exit from 210, then the DLP system may perform a full content scan, as in 220.

In some embodiments, the DLP system may skip block 210, and instead, always perform a full content scan on any data associated with a transmission attempt. In other embodiments, the DLP system may avoid a full scan of every data transmission by performing full content scans only on data that it determines to be potentially sensitive. In such embodiments, various heuristics may be applied to determine if data is potentially sensitive. For example, file metadata, such as the identity of a file's owner, the date of creation, the date of last modification, the file type, and/or other file metadata may be considered by the DLP system when determining if a file scan should be performed. If the DLP system determines that the data does not contain sensitive content, then it may simply allow the transmission without performing additional steps, as indicated by the negative exit from 210 to 250.

In some embodiments, an offline content scan may determine if data stored on a given system is sensitive or may be sensitive. For example, a background scan of a file system may perform a content scan on each file and then associate metadata with the file, such that the metadata indicates whether each file contains or may contain sensitive information. In such embodiments, the DLP system may consider such metadata when deciding, as in 210, if it should perform a full content scan, as in 220. For example, if a background check has determined that a given file does not contain sensitive information and attached metadata to the file indicative of this determination, the DLP system may check whether the file has been modified since the background check has made its determination. If the file was not modified, then the DLP system may conclude that the data is still not sensitive and simply allow the transfer to occur, as in the negative exit from 210 to 250.

As discussed above, if the DLP system determines that a content scan is not needed, then it may allow the transfer, as in the negative exit from 210 to 250. However, if the content is potentially sensitive, then the DLP system may perform a full content scan, as in 220. If the content scan reveals that the data is sensitive, as in the affirmative exit from 230, then the DLP system may perform one or more data loss prevention actions, such as disallowing the data transmission, as in 260. In various embodiments, the DLP system may also perform other data loss prevention actions, such as sequestering the data and/or recording the transmission attempt to a log.

If a content scan of data, such as 210, does not reveal that the data is sensitive, as indicated by the negative exit from 230, it may still be the case that the data does contain sensitive information, but is encrypted. For example, if the data includes cipher text, then the content scan of 210 may not detect that the cipher text actually contains sensitive information. Therefore, according to various embodiments, if the content scan fails to detect sensitive information in the data, the DLP system may attempt to detect if the data is encrypted, as in 240. If the DLP system determines that the data is not encrypted, as indicated by the negative exit from 240, then the DLP system may allow the transmission, as in 250. Otherwise, the DLP system may perform one or more data loss prevention actions, such as disallowing the data transmission, as in 260, and/or sequestering the data.

In some embodiments, the DLP system may determine that the data is encrypted based upon metadata associated with the data. For example, a background may determine that the data is encrypted and associate metadata with the data to indicate this. This metadata may be read by the DLP system in order to support decision 240.

In various embodiments, the DLP system may be configured to identify data as being encrypted (i.e., cipher text), based, at least in part, on a measure of the data's compressibility characteristics. Data compression may be a process of encoding data (e.g., files) in a format that uses less storage space (e.g., fewer bits) than does the unencoded version of the same data. Many algorithms, tools, and techniques exist for performing data compression on arbitrary data, such as Lempel-Ziv (LZ) and its variations, including LZ-Renau (LZR) and others. Commercially and freely available software tools exist for compressing and decompressing arbitrary data (e.g., WinZip™ gzip, etc).

In various embodiments, the DLP system may identify potentially encrypted data based, at least in part, on one or more compressibility measures of the given data having values indicative of encrypted data. As used herein, the term compressibility measure may refer to any measure of the effectiveness of a given compression algorithm or algorithms in decreasing the storage space required to store the information represented by the data. For example, a compression ratio may be an example of a compressibility measure and may refer to a ratio between the amount of storage space required to store given data in a compressed format versus the amount required for storing it in an uncompressed format.

A lossless compression algorithm, such as LZ and LZR, may attempt to compress data by exploiting redundancy in the data. However, since good encryption algorithms typically aim to produce cipher text that is essentially random, cipher text produced with such algorithms often does not contain sufficient redundancy to be effectively compressed by a lossless compression algorithm. Therefore, it is often the case that encrypted data in a compressed format actually uses more storage space than the same encrypted data does before compression. For example, an encrypted file may actually increase in size when it is "compressed" using a compression tool, such as gzip.

In various embodiments, the DLP system may identify potentially encrypted data based, at least in part, on one or more measures of the data's compressibility, such as a compression ratio. For example, if a file has a size of 1 Megabyte when uncompressed and 0.75 Megabytes when compressed, then the compression ratio for that file may be 1:0.75 or 0.75. In this case, the compression ratio is calculated as the compressed size of the data divided by the uncompressed size of the data, though in various embodiments, any metric of comparison may be used.

Figure 3:
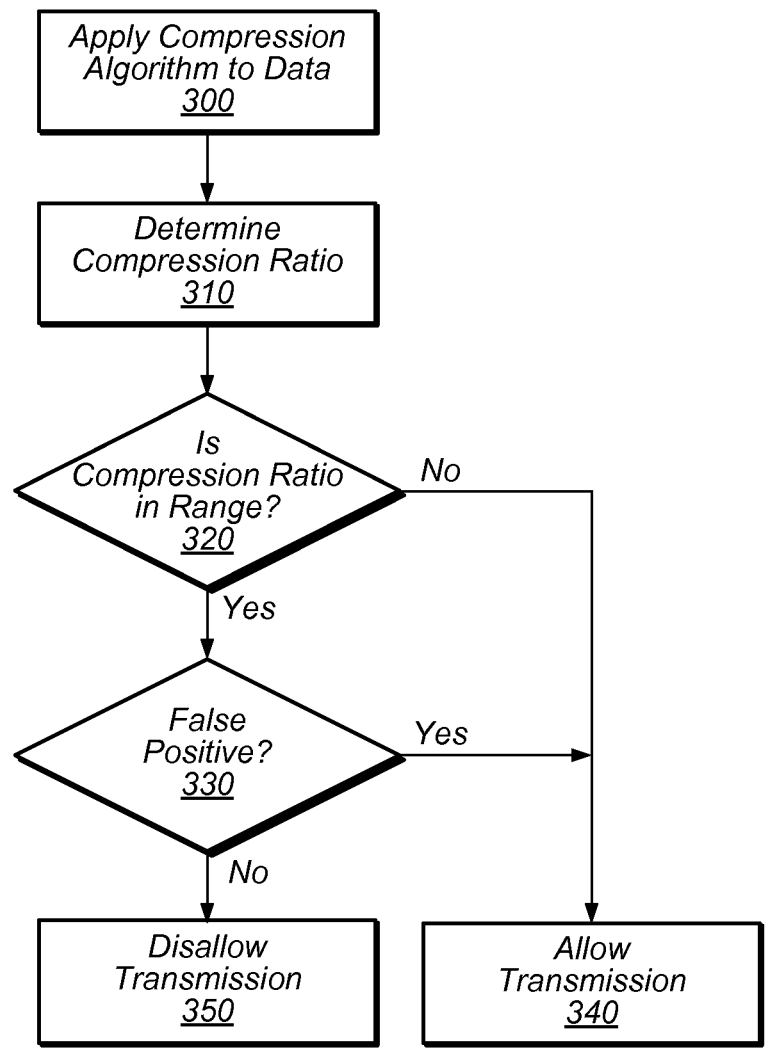
FIG. 3 is a flow diagram illustrating a method for identifying and processing cipher text with a data loss prevention system, using compressibility measure values of the data, according to one embodiment.

FIG. 3 illustrates a method by which a DLP system may detect that data is encrypted, according to various embodiments. In some embodiments, the illustrated method may correspond to decision 240 of FIG. 2 as provided by any of the DLP software modules 115, 125, 135 and/or 145. According to the illustrated method of FIG. 3, to determine if data (e.g., a file or part of a file) is encrypted, the DLP system may apply a compression algorithm to the data, as in 300. In some embodiments, the compression algorithm may be any of various compression algorithms, such as LZ or LZR.

In some embodiments, the application of the compression algorithm of 300 may include producing a compressed version of the data. In such embodiments, the DLP system may compare the size of the compressed version to the size of the uncompressed version to determine one or more compressibility measure values of the original data, such as a compression ratio. For example, in one embodiment the DLP system may create a compressed version of the data and calculate a compression ratio for the data, based on the respective sizes of the original and compressed data.

In some embodiments, the DLP system may implement the compression itself. In other embodiments, the DLP system may utilize external libraries and/or available operating system utilities to implement the compression of data. For example, in one embodiment, the DLP system may compress data by utilizing a compression utility registered with the operating system as the default compression utility.

In some embodiments, a measure of compressibility, such as a compression ratio, may be calculated without compressing the original data. For example, the DLP system may perform an analysis of the data to determine or estimate its compression ratio without actually compressing the file and storing the compressed data. In such embodiments, the operations of block 300 of FIG. 3 may not be necessary, since the DLP system could directly determine the compression ratio without actually performing the compression.

In some embodiments, the DLP system may determine one or more compressibility measure values, at least in part, based on metadata associated with the data. For example, in a DLP system which includes an offline background content scan as described above, the content scan may determine a compression ratio and associate that ratio with the data as metadata (e.g., metadata of a file). In various embodiments, any number of other compressibility metrics may be determined and associated with the data. In order to determine a compressibility measure value, such as the compression ratio determination of 310, the DLP system may read the data's associated metadata. If the data had not changed since the metadata was created, then the DLP system may rely on the compressibility measure values presented in the metadata.

After gathering one or more compressibility measure values for the data, the DLP system may determine if those measures are indicative of cipher text. For example, in the method of FIG. 3, after determining a compression ratio, as in 310, the DLP system may compare the compression ratio to a range of compression ratios that are indicative of cipher text, as in 320. In various embodiments, the range may be configurable by an administrator (e.g., by a programmable a configuration setting). A wide range may reflect a more conservative DLP policy than a narrower range.

For example, an administrator may observe that a given compression algorithm and/or utility may cause cipher text to expand in size by around 33%. In such a case, the administrator may decide that the DLP system should identify only data with a compression ratio between 1.30 and 1.35 as potentially encrypted. However, if the DLP system encounters cipher text that is compressible to outside of the 1.30 lower bound, then such cipher text may go undetected. If the administrator is concerned with detecting a greater percentage of cipher text instances, he may increase the range (e.g., 1.25-1.40), at the risk of introducing more false positive identifications.

In some embodiments, if the compressibility measure values gathered by the DLP system indicate that the data should not be identified as encrypted, then the DLP system may allow the transmission of that data. For example, in the method of FIG. 3, if the compression ratio is outside of the suspect range, as indicated by the negative exit from 320, then the DLP system may allow the transmission, as in 340. However, if the compression ratio is in range, as indicated by the affirmative exit from 320, the DLP system may still consider the data as potentially encrypted.

In some embodiments, the DLP system may consider the values of any number of compressibility measures in combination. For example, the DLP system may be configured to classify the data as unencrypted if its compression ratio falls inside of a first range for a first compression algorithm and inside of a second range for a second compression algorithm. In another embodiment, the test can be extended to a third range and third compression algorithm and the data may be classified as encrypted or un-encrypted based on results from at least two of the three range tests.

In some embodiments, the DLP system may identify the data as encrypted or un-encrypted based on one or more compressibility measure values, as described above. However, in some instances, it may be possible that given data meets the compressibility criteria for encrypted data but is not itself encrypted data. This scenario may be referred to herein as a false positive. For example, compressed data may have a similar compression ratio to encrypted data, since compressed data also has very little if any redundancy.

In some embodiments, a DLP system may attempt to identify false positives, as in 330. In one such embodiment, if the DLP system determines that the data is not actually encrypted (i.e., a false positive), as indicated by the affirmative exit from 330, then the DLP system may permit the data transfer. If the DLP system does not detect a false positive, as indicated by the negative exit from 330, then the DLP system may perform one or more pre-configured data loss prevention actions, such as disallowing the data transmission, as in 350, and/or sequestering the data.

Figure 4:
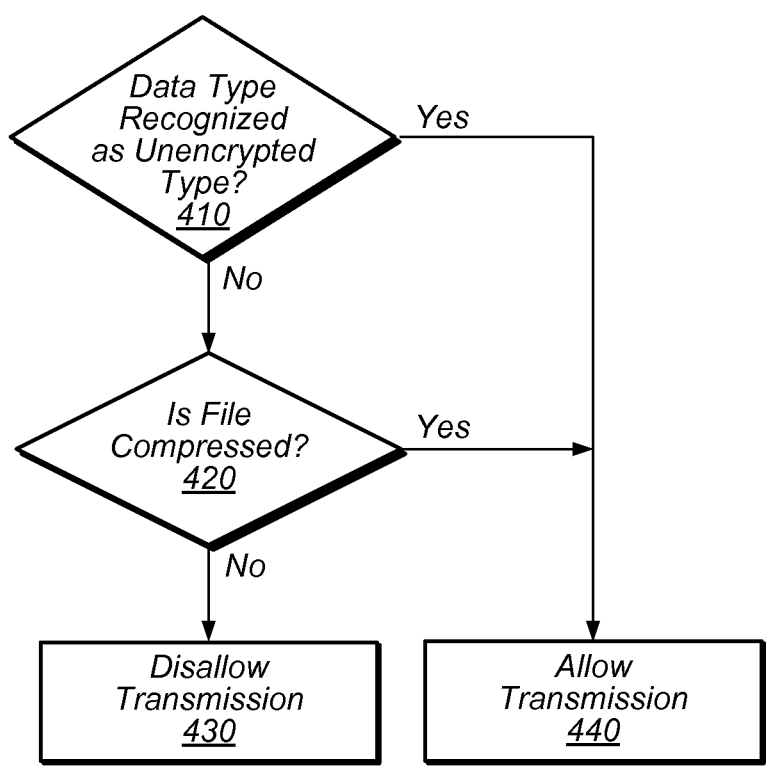
FIG. 4 is a flow diagram illustrating a method for differentiating cipher text from other types of data processed by a data loss prevention system, according to one embodiment.

FIG. 4 illustrates a method by which a DLP system may identify false positives, according to some embodiments. In some embodiments, the method of FIG. 4 may correspond to decision 330 of FIG. 3 as provided by any of the DLP software modules 115, 125, 135 and/or 145. Thus, such embodiments, the method of FIG. 4 may be executed by a DLP system in response to determining that one or more compressibility measure values of the data indicate that the data may be encrypted.

According to the method of FIG. 4, the DLP system may attempt to identify the data type, as in 410. For example, in one embodiment, a DLP system may utilize various operating system and/or file system capabilities in an attempt to identify the file. For a given file, this may include examining the file extension and/or file headers. For example, in some operating systems, a "magic number" may be included in some files, such that the magic number identifies the file format of the contained data. For instance, image files in a JPEG format begin with the magic number (in hexadecimal) FF D8 and end with FF D9. In various embodiments, a DLP system may search for such magic numbers in the data in order to determine if type of data being examined.

In some embodiments, the DLP system may leverage any number of other various utilities available on the system. For example, many Linux systems provide a "file" command, which may be used to guess the type for a given file. In some embodiments, a DLP system deployed in such an environment may utilize an operating system utility such as the file command to guess the type of data that a given transmission attempt is aimed at moving.

In various embodiments, if the DLP system determines that the data type is indicative of an unencrypted file, as indicated by the affirmative exit from 410, then the DLP system may allow the data transmission attempt to proceed. On the other hand, if the DLP system cannot determine that the file is an unencrypted type, it may assume that the file is encrypted and perform various data loss prevention actions, such as disallowing the transmission of the data and/or sequestering the data.

In some embodiments, the DLP system may identify false positives by attempting to determine whether the file is compressed. This may be done instead of using operating system utilities (as in 410) or in addition to using such utilities (as in FIG. 4). Recall that compressed data, like encrypted data, may grow in size when a compression algorithm is applied. Thus, compressed data may have similar compressibility measure values (e.g., compression ratio) to those of encrypted data and may thus be misidentified as encrypted if only compressibility measures are used.

In some embodiments, the DLP system may determine if the data is compressed, as in 420. In various embodiments, the DLP system may make this determination by attempting to uncompress the data using various compression/decompression utilities. If the decompression is successful, then the DLP system may determine that the data is compressed rather than encrypted, as in the affirmative exit from 420. In the illustrated embodiment, if the DLP system determines that the data is compressed rather than encrypted, then it may allow the data transmission, as in 440. In some embodiments, upon successfully decompressing the data, such the data transmission may also be conditional upon the DLP system scanning the decompressed data to determine whether the uncompressed data is sensitive (e.g., by detecting a particular keyword), as discussed above.

In the illustrated embodiment of FIG. 4, if the DLP system is unable to determine that the file is compressed, as indicated by the negative exit from 420, it may disallow the transmission, as in 430, and/or perform one or more other data loss prevention actions, such as sequestering the data.

In various embodiments, the DLP system may perform fewer or additional tests to determine whether the data is encrypted. In various embodiments, the tests (e.g., 320, 410, 420, etc.) may be performed in different orders than that which is illustrated in FIG. 3 and FIG. 4. For example, in one embodiment, the DLP system utility checks of 410 may be performed prior to the compressibility measure checks of 320. In some embodiments, various data tests, such as those described herein may be combined in different configurations to determine if data is encrypted.

For example, according to one embodiment, a DLP system may determine whether one or more compressibility measure values of the data are indicative of an encrypted file. If so, the DLP system may attempt to check for false positives, by attempting to identify the file as a known type, using various operating system and/or file system utilities. If the file cannot be recognized, the DLP system in this embodiment may attempt to determine if the file is actually compressed rather than encrypted, by attempting to decompress the file using one or more decompression utilities.

In various embodiments, the data to which the method of FIG. 3 is applied may comprise a file or a part of a file. For example, in one embodiment, if the DLP system detects an attempt to transmit a given file to an outside party, it may attempt to detect if the file is encrypted by performing the method of FIG. 3. However, if the DLP system does not determine that the file is encrypted, the DLP system may repeat all or part of the method of FIG. 3, on various parts of the file. For example, a user may be able to modify the compression characteristics of a given file by adding data to the file. To detect such cases, the DLP system, according to various embodiments, may determine one or more compressibility measure values for various parts of a file.

Figure 5:
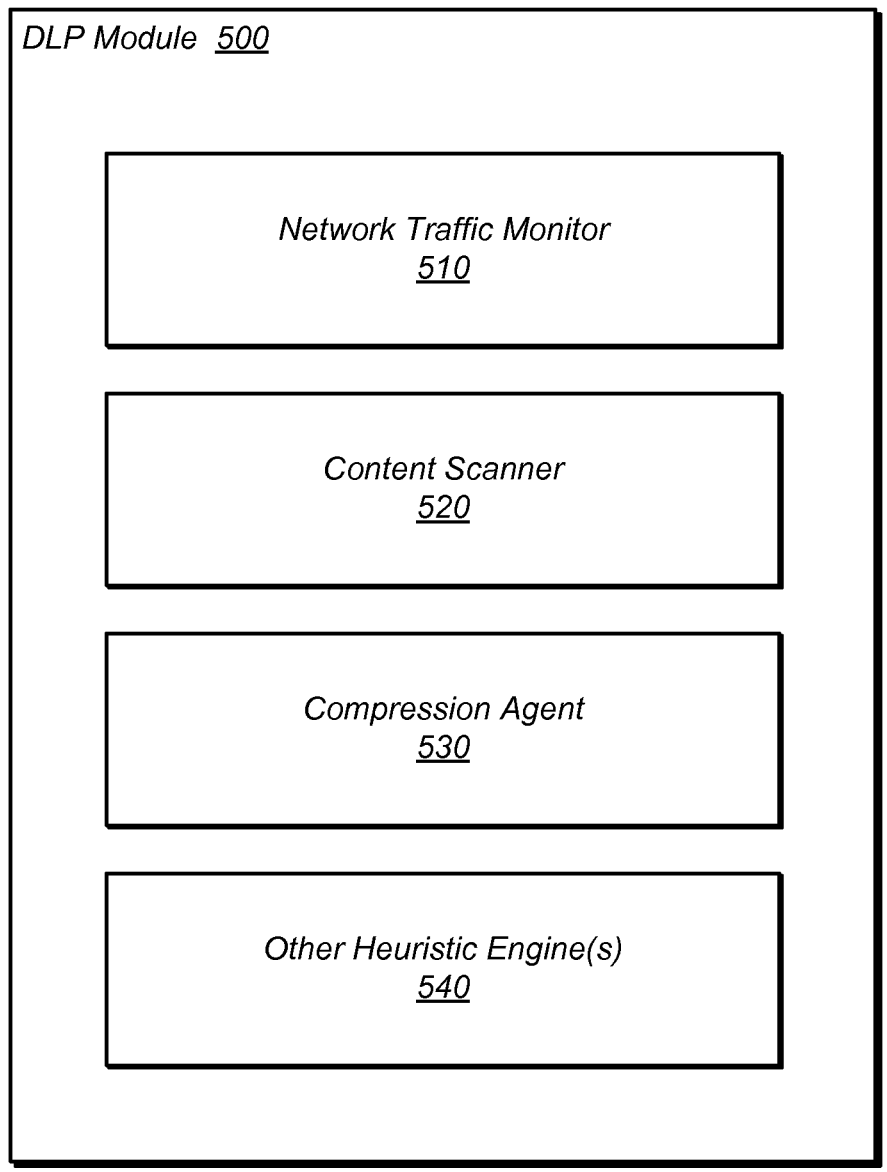
FIG. 5 is a block diagram of an embodiment of a DLP software module, according to one embodiment.

FIG. 5 illustrates an embodiment of a DLP software module 500 illustrative of particular functionality that may be provided by any of the DLP software modules 115, 125, 135 and/or 145 described above. Thus, DLP software module 500 may be deployed on an endpoint system, or on a router or other network gateway, as described above.

DLP software module 500 includes network traffic monitor 510. upon execution, network traffic monitor 510 may detect data transmission attempts from and to the host system. Network traffic monitor 510 may allow or disallowing data transfers, depending on the sensitivity of the data. According to various embodiments, in response to detecting a data transfer attempt, network traffic monitor may invoke content scanner 520 to perform a content scan on the data. If the content scan determines that the data is sensitive, then network traffic monitor 510 may block the data transfer and/or invoke other components to perform other data loss prevention actions, such as sequestering the data.

If content scanner 520 does not determine that the data is sensitive, then the compressibility characteristics of the data may be determined, as described above. For example, DLP software module 500 may include compression agent 530, which may determine a compression ratio for the data by performing a compression algorithm on the data and comparing the compressed data size to the uncompressed data size. In other embodiments, compression agent 530 may determine one or more compressibility measure values by examining the data, without the need to create a compressed version. In various embodiments, compression agent 530 may leverage external software libraries in order to compress the data and/or determine one or more compressibility measure values.

In various embodiments, DLP software module 500 may include any number of other heuristic engines 540 for performing other tests for detecting encrypted data, as described herein. For example, heuristic engine 540 may comprise one or more utilities for finding magic numbers in files, as described above.

If the DLP module determines that the data is encrypted, as indicated by the results of tests administered by compression agent 530 and/or heuristic engines 540, the network traffic monitor may forbid the data transfer. Otherwise, the network traffic monitor may allow the data transfer.

As stated previously, DLP software module 500 may be deployed as a network DLP instead of or in addition to a host-based DLP. Embodiments other than that illustrated by FIG. 5, including configurations with more or fewer components will become apparent to those skilled in the art once the details of this disclosure are fully appreciated.

Figure 6:
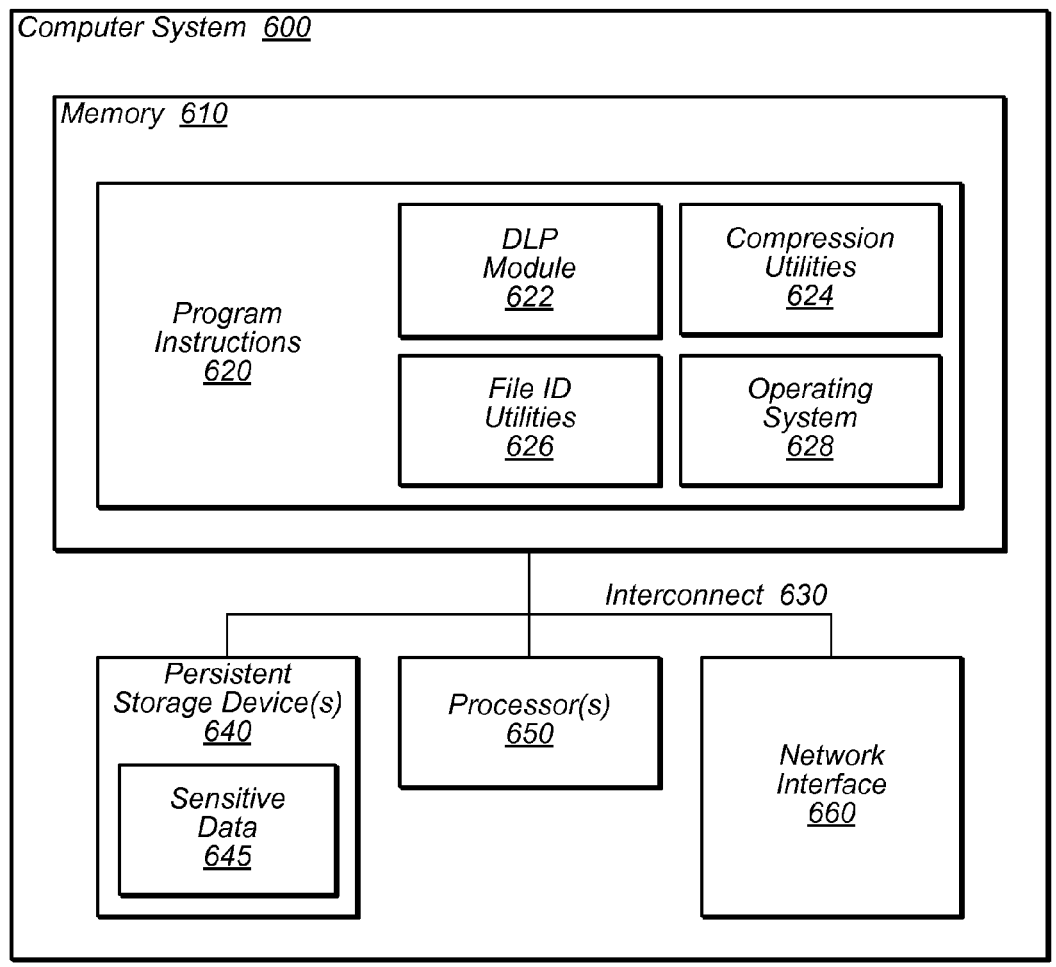
FIG. 6 is a block diagram illustrating a computer system, according to one embodiment.

FIG. 6 illustrates one embodiment of a computer system configured to implement a DLP system, as described herein. Computer system 600 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device. It is noted that any of workstations 110 and 120, server 130 and/or gateway 140 may be embodied according to the configuration of FIG. 6.

Computer system 600 may include one or more processors 650, each of which may include multiple cores, any of which may be single or multi-threaded. The computer system 600 may also include one or more persistent storage devices 640 (e.g. optical storage, magnetic storage, hard drive, tape drive, solid state memory, etc), which may store sensitive data, such as 645. Computer system 600 may include one or more memories 610 (e.g., one or more of cache, SRAM, DRAM, RDRAM, EDO RAM, DDR 10 RAM, SDRAM, Rambus RAM, EEPROM, etc.). Computer system 600 may include one or more network interfaces 660 for transmitting and receiving data, which may be monitored for sensitive data using a DLP system, as described herein. Various embodiments may include fewer or additional components not illustrated in FIG. 6 (e.g., video cards, audio cards, additional network interfaces, peripheral devices, a network interface such as an ATM interface, an Ethernet interface, a Frame Relay interface, etc.)

The one or more processors 650, storage device(s) 640, network interface 660 and system memories 610 may be coupled to system interconnect 630. One or more of the system memories 610 may contain program instructions 620. Program instructions 620 may be encoded in platform native binary, any interpreted language such as Java™ byte-code, or in any other language such as C/C++, Java™, etc or in any combination thereof.

Program instructions 620 may include program instructions executable to implement one or more DLP software modules 622, for implementing a data loss prevention system with the capability to recognize and process cipher text, as described herein. DLP software module 622 may implement a host-based and/or network DLP.

According to the illustrated embodiment, memory 610 may also comprise program instructions executable to implement one or more compression utilities 624 and/or file identification utilities 626, which may be leveraged by the DLP software module 622 for identifying encrypted data as described herein. Program instructions 620 may also include one or more operating systems 628, such as Windows™ and/or Linux.

The DLP systems as described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer-readable medium, storing program instructions executable by a computing device to:
   detect an attempt to transmit data;
   in response to detecting the attempt to transmit the data:
      determine a compression ratio of the data;
      determine that the data is encrypted based on determining that the compression ratio of the data is within a particular range of compression ratios; and
      disallow the attempt to transmit the data in response to said determining that the data is encrypted.

2. The non-transitory computer-readable medium of claim 1, wherein the particular range is adjustable by an administrator.

3. The non-transitory computer-readable medium of claim 1, wherein the program instructions are further executable by the computing device to implement sequestering the data in response to determining that the data is encrypted.

4. The non-transitory computer-readable medium of claim 1, wherein the program instructions are further executable by the computing device to allow or disallow the attempt to transmit the data depending upon whether the data comprises a known, unencrypted file type.

5. The non-transitory computer-readable medium of claim 1, wherein the program instructions are further executable by the computing device to allow or disallow the attempt to transmit the data depending upon a result of an attempt to decompress the data.

6. The non-transitory computer-readable medium of claim 1, wherein the program instructions are further executable by the computing device to:
   determine whether the determination of the data being encrypted was a false positive determination;
   wherein the program instructions are executable by the computing device to perform said disallowing the attempt to transmit the data in response to determining that the determination of the data being encrypted was not a false positive determination.

7. The non-transitory computer-readable medium of claim 6,
   wherein in performing said determining whether the determination of the data being encrypted was a false positive determination, the program instructions are executable by the computing device to determine whether the data is data of a known unencrypted type;
   wherein the program instructions are executable by the computing device to determine that the determination of the data being encrypted was not a false positive determination in response to determining that the data is not data of a known unencrypted type.

8. The non-transitory computer-readable medium of claim 6,
   wherein in performing said determining whether the determination of the data being encrypted was a false positive determination, the program instructions are executable by the computing device to determine whether the data is compressed;
   wherein the program instructions are executable by the computing device to determine that the determination of the data being encrypted was not a false positive determination in response to determining that the data is not compressed.

9. The non-transitory computer-readable medium of claim 6, wherein the attempt to transmit the data is a first attempt to transmit first data, wherein the program instructions are further executable by the computing device to:
  detect a second attempt to transmit second data;
  in response to detecting the second attempt to transmit the second data:
    determine a compression ratio of the second data;
    determine that the second data is encrypted based on determining that the compression ratio of the second data is within the particular range of compression ratios;
    determine that the determination of the second data being encrypted was a false positive determination; and
    allow the attempt to transmit the second data in response to said determining that the determination of the second data being encrypted was a false positive determination.

10. A system comprising:
  one or more processors; and
  a memory coupled to the one or more processors and storing program instructions executable by the one or more processors to:
    detect an attempt to transmit data;
    in response to detecting the attempt to transmit the data:
    determine a compression ratio of the data;
    determine that the data is encrypted based on determining that the compression ratio of the data is within a particular range of compression ratios; and
    disallow the attempt to transmit the data in response to said determining that the data is encrypted.

11. The system of claim 10, wherein the particular range is adjustable by an administrator.

12. The system of claim 10, wherein the program instructions are further executable by the one or more processors to implement sequestering the data in response to determining that the data is encrypted.

13. The system of claim 10, wherein the program instructions are further executable by the one or more processors to allow or disallow the attempt to transmit the data depending upon whether the data comprises a known, unencrypted file type.

14. The system of claim 10, wherein the program instructions are further executable by the one or more processors to allow or disallow the attempt to transmit the data depending upon a result of an attempt to decompress the data.

15. The system of claim 10, wherein the program instructions are further executable by the one or more processors to:
  determine whether the determination of the data being encrypted was a false positive determination;
  wherein the program instructions are executable by the one or more processors to perform said disallowing the attempt to transmit the data in response to determining that the determination of the data being encrypted was not a false positive determination.

16. The system of claim 15, wherein the attempt to transmit the data is a first attempt to transmit first data, wherein the program instructions are further executable by the one or more processors to:
  detect a second attempt to transmit second data;
  in response to detecting the second attempt to transmit the second data:
    determine a compression ratio of the second data;
    determine that the second data is encrypted based on determining that the compression ratio of the second data is within the particular range of compression ratios;
    determine that the determination of the second data being encrypted was a false positive determination; and
    allow the attempt to transmit the second data in response to said determining that the determination of the second data being encrypted was a false positive determination.

17. A method comprising:
  a computer system detecting an attempt to transmit data;
  in response to detecting the attempt to transmit the data:
    the computer system determining a compression ratio of the data;
    the computer system determining that the data is encrypted based on determining that the compression ratio of the data is within a particular range of compression ratios; and
    the computer system disallowing the attempt to transmit the data in response to said determining that the data is encrypted.

18. The method of claim 17, further comprising:
  determining whether the determination of the data being encrypted was a false positive determination;
  wherein the attempt to transmit the data is disallowed in response to determining that the determination of the data being encrypted was not a false positive determination.

19. The method of claim 18, wherein the attempt to transmit the data is a first attempt to transmit first data, wherein the method further comprises:
  detecting a second attempt to transmit second data;
  in response to detecting the second attempt to transmit the second data:
    determining a compression ratio of the second data;
    determining that the second data is encrypted based on determining that the compression ratio of the second data is within the particular range of compression ratios;
    determining that the determination of the second data being encrypted was a false positive determination; and
    allowing the attempt to transmit the second data in response to said determining that the determination of the second data being encrypted was a false positive determination.

* * * * *